United States Patent
Ishigami et al.

(10) Patent No.: US 9,281,724 B2
(45) Date of Patent: Mar. 8, 2016

(54) ROTATING ELECTRICAL MACHINE INCLUDING CONCENTRATED SINGLE-LAYER WINDING COIL

(71) Applicant: Hitachi Automotive Systems, Ltd., Hitachinaka-shi, Ibaraki (JP)

(72) Inventors: Takashi Ishigami, Yokohama (JP); Kenji Nakayama, Hitachi (JP); Hiroshi Kanazawa, Hitachiota (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 355 days.

(21) Appl. No.: 13/950,890

(22) Filed: Jul. 25, 2013

(65) Prior Publication Data
US 2014/0028143 A1 Jan. 30, 2014

(30) Foreign Application Priority Data
Jul. 26, 2012 (JP) ................. 2012-166026

(51) Int. Cl.
*H02K 3/00* (2006.01)
*H02K 3/18* (2006.01)
*H02K 3/52* (2006.01)

(52) U.S. Cl.
CPC .. *H02K 3/00* (2013.01); *H02K 3/18* (2013.01); *H02K 3/522* (2013.01); *H02K 2203/12* (2013.01)

(58) Field of Classification Search
CPC ............. H02K 3/00; H02K 3/18; H02K 3/32; H02K 3/325; H02K 3/34; H02K 3/345; H02K 3/52; H02K 3/521; H02K 3/522
USPC ................... 310/208, 195, 214, 198, 216.008
See application file for complete search history.

(56) References Cited

U.S. PATENT DOCUMENTS

| 2001/0025897 A1 | 10/2001 | Fulton et al. | |
|---|---|---|---|
| 2009/0179725 A1* | 7/2009 | Asano | H02K 3/18 336/222 |
| 2010/0264773 A1* | 10/2010 | Hino | H02K 3/34 310/198 |

FOREIGN PATENT DOCUMENTS

| JP | 2002-190415 A | | 7/2002 | |
|---|---|---|---|---|
| JP | 2004-350450 A | | 12/2004 | |
| JP | 2004350450 A | * | 12/2004 | ............... H02K 3/34 |
| JP | 2005-102454 A | | 4/2005 | |
| JP | 2008-148515 A | | 6/2008 | |
| JP | 2009-118574 A | | 5/2009 | |
| JP | 2011-36092 A | | 2/2011 | |

* cited by examiner

*Primary Examiner* — Michael Andrews
(74) *Attorney, Agent, or Firm* — Crowell & Moring LLP

(57) ABSTRACT

In a rotating electrical machine, the concentrated winding coil includes a single-layer coil, corresponding to one layer, wound in a first turn advancing mode with the wire forming sequential coil turns starting from one end of the insulating bobbin toward another end of the insulating bobbin and another single-layer coil, corresponding to one layer, wound in a second turn advancing mode with the wire forming turns starting from the other end of the insulating bobbin toward the one end of the insulating bobbin, with the single-layer coil and the other single-layer coil layered alternately to each other. The insulating bobbin includes a winding portion where the concentrated winding coil is formed, collars each formed at one of two ends of the winding portion and at least one projecting portion configured to disallow misalignment at a turn changeover start area in the first and second turn advancing modes.

1 Claim, 18 Drawing Sheets

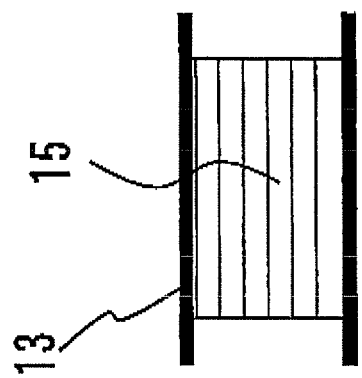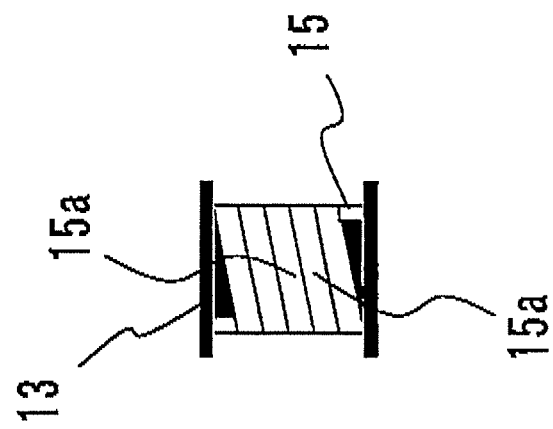

FIRST LAYER, 1-2T

FIRST LAYER, 2-3T

FIRST LAYER, 3-4T

SECOND LAYER, 4-5T

SECOND LAYER, 5-6T

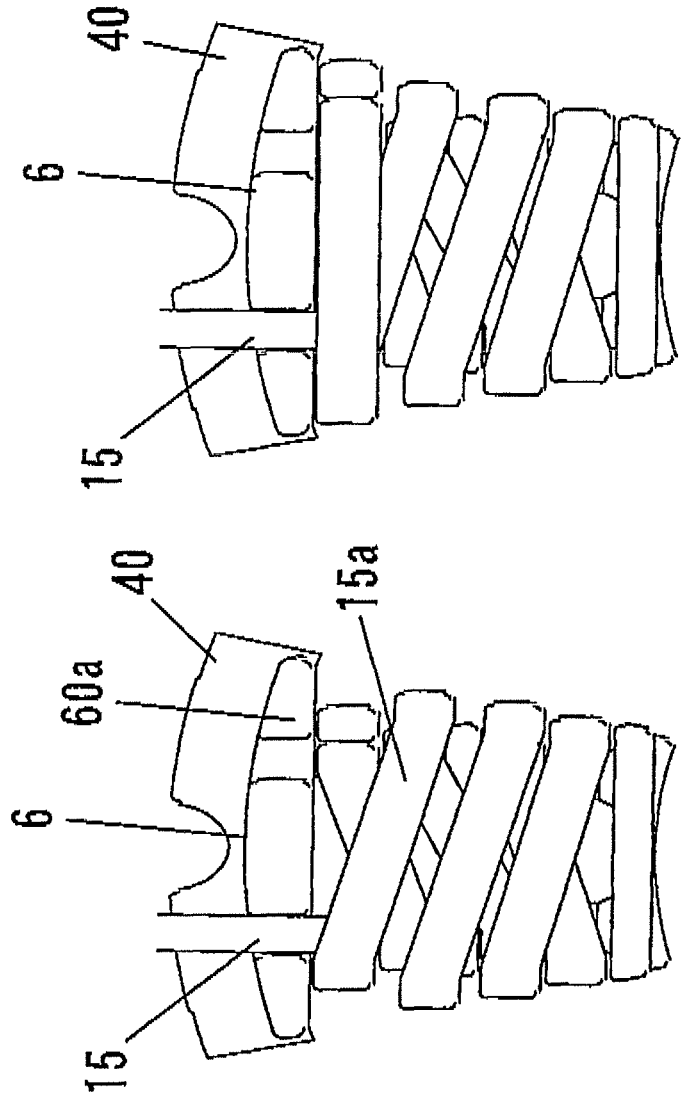

END OF FIRST LAYER

END OF THIRD LAYER though the use of a stator constituted with stator core segments or through the use of rectangular wire as the winding material. Compared to a stator with a single-piece core in the related art, a stator that adopts a concentrated winding method and includes a stator core constituted with core segments allows a greater number of coil turns and also allows the use of thicker wire, and therefore, a more compact rotating electrical machine, capable of providing greater output and assuring higher efficiency, can be achieved in conjunction with such a stator. In addition, by using a base wiring material constituted with rectangular wire instead of round wire, the cross-sectional area of the conductors that can be disposed within the slots can be increased, which, in turn, makes it possible to reduce ohmic loss at the rotating electrical machine.

ROTATING ELECTRICAL MACHINE INCLUDING CONCENTRATED SINGLE-LAYER WINDING COIL

INCORPORATION BY REFERENCE

The disclosure of the following priority application is herein incorporated by reference: Japanese patent application no. 2012-166026 filed Jul. 26, 2012

BACKGROUND OF THE INVENTION

1. Field of the Invention

The present invention relates to a rotating electrical machine such as a motor or a generator.

2. Description of Related Art

There is an ever-increasing need for the development of viable technologies that reduce $CO_2$ emissions in order to address the issue of global warming. Among such technologies, high-efficiency rotating electrical machines, such as motors and generators, and electric vehicles, realized in conjunction with smaller rotating electrical machines capable of providing increased torque, attract our attention as potential means for $CO_2$ emission reduction.

In Japan, motors, which are regarded as the "the industrial kernel", account for approximately 70% of power used at factories. This means that by improving the motor efficiency by a few percent, a very significant energy saving, equivalent to several hundred thousand kilowatts of power generated at a power plant, could be achieved, which, in turn, would contribute to reducing $CO_2$ emissions by several millions of tons per year. In addition, concerted efforts are being made toward further electrification of vehicles and promotion of consumer awareness of eco-friendly options such as HEVs (hybrid electric vehicles) and EVs (electric vehicles) as means for reducing $CO_2$ emissions from transportation vehicles. For instance, an HEV, which requires only half the fuel used by a conventional gasoline-powered vehicle, also achieves greatly reduced $CO_2$ emissions. Furthermore, vehicle electrification achieved by, for instance, motor-driven power steering instead of the conventional hydraulic power steering, improves fuel efficiency by 3 to 5% due to start-stop systems, and thus contributes to $CO_2$ emission reduction.

The issues discussed above form a backdrop to the direction of resources aimed toward development of technologies that will improve the efficiency of rotating electrical machines (motors and generators) and more compact rotating electrical machines capable of generating greater torque (with higher efficiency) primarily geared to automotive use, so as to ultimately contribute toward creating a society with a lighter carbon footprint.

A more compact rotating electrical machine capable of generating larger torque and assuring high efficiency may be achieved by mounting a coil at a stator core with higher density. The joule heat generated as power is supplied to the stator core results in energy loss in the rotating electrical machine. This means that the efficiency of the rotating electrical machine can be improved by reducing the electrical resistance at the starter coil. In addition, the level of electromagnetic force is calculated as the BIL product (B: magnetic flux density, I: current, L: conductor length) and thus, a greater motor output can be provided by increasing the number of turns with which the stator coil is wound. In other words, a given output can be provided by a smaller motor. Accordingly, it is essential that a coil mounting structure be devised that will allow the conductor density (number of conductor lines X area) within a slot to be improved.

Such a coil mounting structure may be achieved through the use of a stator constituted with stator core segments or through the use of rectangular wire as the winding material. Compared to a stator with a single-piece core in the related art, a stator that adopts a concentrated winding method and includes a stator core constituted with core segments allows a greater number of coil turns and also allows the use of thicker wire, and therefore, a more compact rotating electrical machine, capable of providing greater output and assuring higher efficiency, can be achieved in conjunction with such a stator. In addition, by using a base wiring material constituted with rectangular wire instead of round wire, the cross-sectional area of the conductors that can be disposed within the slots can be increased, which, in turn, makes it possible to reduce ohmic loss at the rotating electrical machine.

When forming a coil with rectangular wire at a core segment wound with a concentrated winding method, a bobbin, constituted of an insulating material, is first mounted at the core segment and then the rectangular wire is wound at the bobbin. However, the rectangular wire cannot be wound at the bobbin in a trefoil formation, whereby non-angular wire, such as round wire, is stacked in a staggered pattern, and thus, the individual wire wraps tend to become misaligned (shifted laterally) during the winding process. Japanese Laid Open Patent Publication No. 2004-350450 discloses a structure intended to prevent such misalignment by forming stages at the bobbin.

SUMMARY OF THE INVENTION

When rectangular wire is wound at the bobbin over a plurality of layers, the turn-advancing direction (the direction along which the winding position changes with each turn) switches as a new layer starts. The bobbin structure with stages formed thereat described above does not provide full misalignment prevention. Namely, it only prevents misalignment along one of the two (reciprocal) turn-advancing directions and thus, misalignment is bound to occur while winding the rectangular wire along the other turn-advancing direction.

A rotating electrical machine according to a first aspect of the present invention, comprise: a stator that includes a plurality of core segments disposed in a circular formation, an insulating bobbin mounted at each of the core segments and a concentrated winding coil formed by winding wire with a rectangular cross section at the insulating bobbin; and a rotor, rotatably disposed so as to rotate freely relative to the stator, wherein: each core segment includes a yoke and a tooth, formed so as to project out from the yoke, at which the insulating bobbin is mounted; the concentrated winding coil includes a single-layer coil, corresponding to one layer, wound in a first turn advancing mode with the wire forming sequential coil turns starting from one end of the insulating bobbin toward another end of the insulating bobbin and another single-layer coil, corresponding to one layer, wound in a second turn advancing mode with the wire forming turns starting from the other end of the insulating bobbin toward the one end of the insulating bobbin, with the single-layer coil and the other single-layer coil layered alternately to each other; and the insulating bobbin includes a winding portion where the concentrated winding coil is formed, collars each formed at one of two ends of the winding portion and at least one projecting portion configured to disallow misalignment at a turn changeover start area in the first turn advancing mode and the second turn advancing mode.

BRIEF DESCRIPTION OF THE DRAWINGS

FIGS. 4A and 4B illustrate an ideal winding condition that may be achieved with rectangular wire.

FIGS. 14A and 14B, in reference to which the winding procedure is to be described, respectively show the bobbin at which the wire has been wound through the seventh turn in the second layer and the bobbin at which the wire has been wound through the eighth turn in the third layer.

DESCRIPTION OF PREFERRED EMBODIMENT

Figure 1:
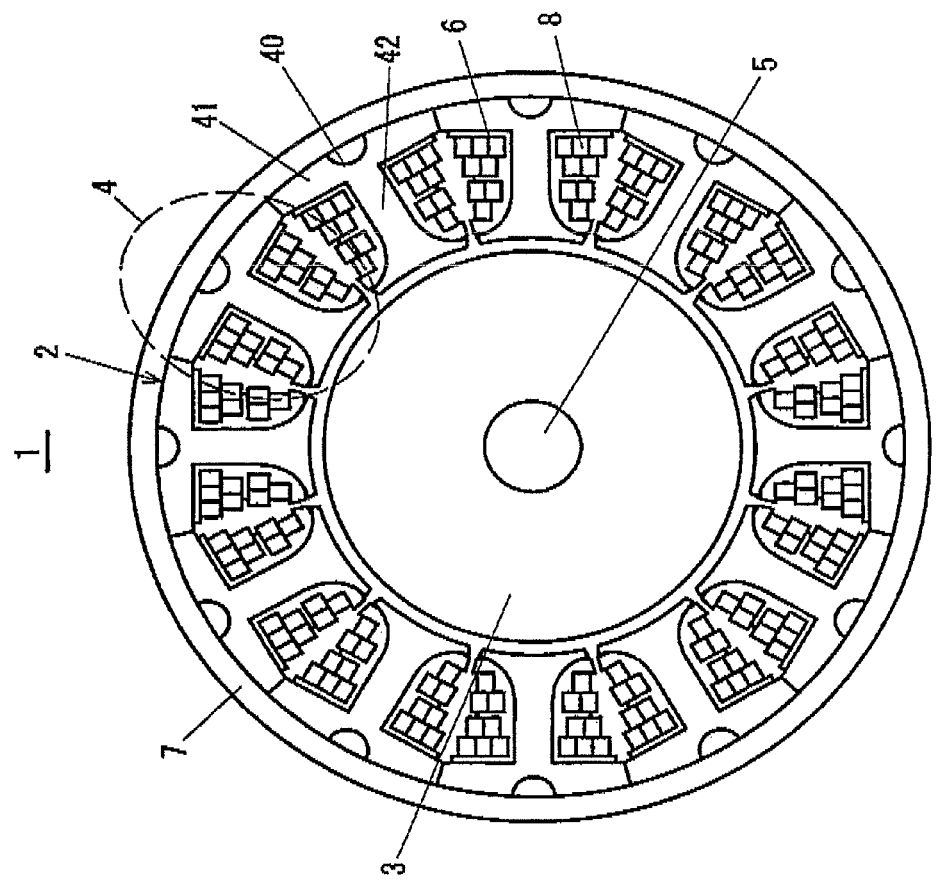
FIG. 1 is a sectional view of the rotating electrical machine achieved in an embodiment.

The following is a description of an embodiment of the present invention given in reference to drawings. FIG. 1 is a sectional view of a rotating electrical machine 1 achieved in the embodiment. A stator 2 of the rotating electrical machine 1 configures a split-type core stator with a plurality of core segments 4 disposed in a circular formation. The stator 2 in the example presented in FIG. I is constituted with twelve core segments 4. The stator 2 is fixed onto the inner circumferential side of a casing 7. A rotor 3 is rotatably disposed inside the stator 2. A rotating shaft 5 of the rotor 3 is rotatably supported via a bearing (not shown).

The core segments 4 each include a core block 40 formed by laminating electromagnetic steel plates or the like and a bobbin 6 constituted of an electrically insulating material. The core block 40 is made up with a yoke 41 and a tooth 42 projecting out from the yoke 41 toward the rotor. As will be described in detail later, a coil 8 is formed at the bobbin 6, which is mounted at the tooth 42, by winding wire material through a concentrated winding method. The gap between the tooth 42 at which the bobbin 6 is mounted and the next tooth 42 forms a slot where portions of the coil 8 extend linearly (referred to as coil sides) are housed.

Figure 2A:
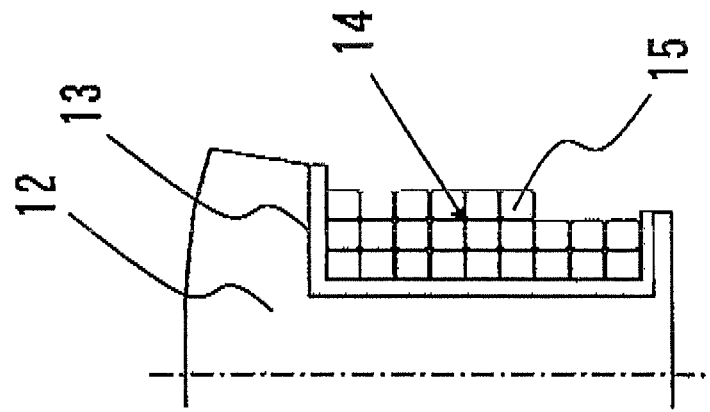
FIG. 2A is a schematic illustration showing a winding formation achieved by forming a coil with round wire through a concentrated winding method and FIG. 2B is a schematic illustration showing a winding formation achieved by forming a coil with rectangular wire through a concentrated winding method.
Figure 2B:
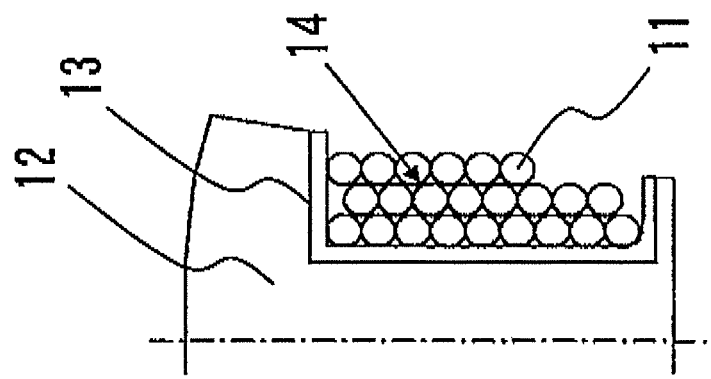

As described earlier, rectangular wire, rather than round wire, is used for coil winding in most concentrated winding with split core-type stators in recent years, in order to improve the performance of rotating electrical machines. FIGS. 2A and 2B provide schematic illustrations of winding formations achieved at coils, respectively constituted with round wire and rectangular wire, formed by adopting a concentrated winding method. FIGS. 2A and 2B each show a core segment in a sectional view taken through the core segment along a direction perpendicular to the stator axis.

As shown in FIG. 2A, round wire 11 can be wound in a neat trefoil formation. However, while the round wire 11 can be wound in a neat winding formation, as described above, its round sectional shape is bound to create geometric gaps 14 between individual wraps. This naturally sets a limit to the level of conductor density (referred to as a space factor) achieved within the slot.

If, on the other hand, rectangular wire 15, with a section thereof achieving a substantially rectangular shape, instead of the round wire 11, is used, gaps 14 between the individual coil wraps can be reduced, as shown in FIG. 2B. While there will be no gap whatsoever if the section of the rectangular wire 15 has a perfect rectangular shape geometrically, the corners of the rectangular wire 15 are actually slightly rounded and, for this reason, small gaps are bound to be formed. However, such gaps will be significantly smaller than those formed in conjunction with the round wire 11 and thus, the conductor density can be greatly improved. In the example presented in FIG. 2A, the round wire 11 is wound with nine turns in the first layer but the round wire 11 is wound with only eight turns in the second layer since it is layered so as to form a trefoil formation with adjacent wraps of the round wire 11, with each coil wrap in the second layer set so as to sit between two coil wraps in the first layer. The rectangular wire 15, on the other hand, is wound in the second layer over nine turns, with each coil wrap set directly above a coil wrap of the rectangular wire 15 in the first layer, as shown in FIG. 2B. Thus, the use of the rectangular wire 15 makes it possible to increase the sectional area of the conductor that can be disposed within, the slot by approximately 15%, which, in turn, leads to a reduction of ohmic loss occurring at the rotating electrical machine.

Figure 3A:
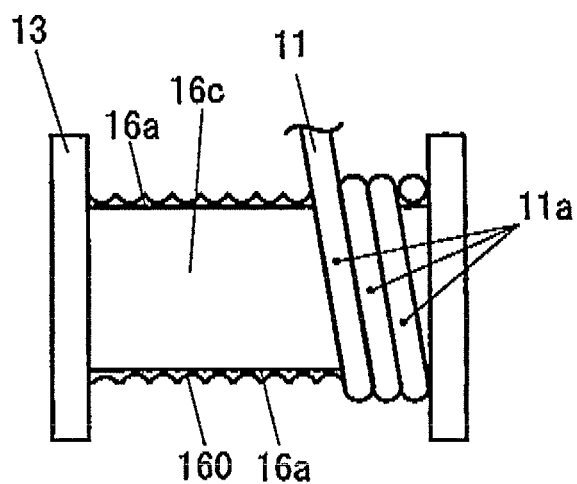
FIGS. 3A and 3B present an example of a bobbin that may be used in conjunction with round wire.
Figure 3B:
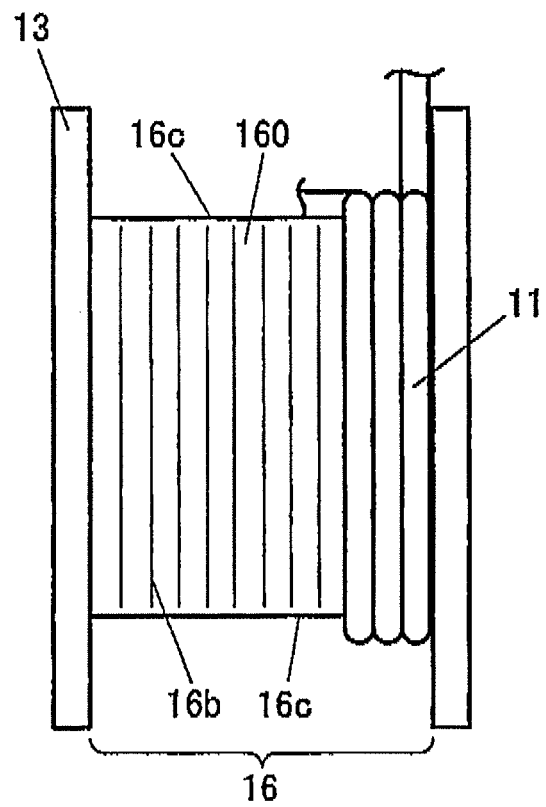

In the related art, grooves 160 with a circular arc shape are formed at corner areas 16a and side surfaces 16b of a winding portion 16 of a bobbin 13 around which the round wire 11 is wound, as illustrated in FIGS. 3A and 3B. FIG. 3A shows the bobbin 13 viewed from a coil-end side, whereas FIG. 3B shows a side surface (a slot-side surface) of the bobbin 13. With such grooves 160 formed as described above, the positions taken by the round wire 11 in the first coil layer within the slot can be regulated so as to take up specific positions. The recesses formed between the individual wraps of the round wire 11 in the lower coil layer function as guides for the round wire 11 in the second coil layer and each subsequent coil layer and, as a result, the round wire 11 can be wound in a neat trefoil formation, as shown in FIG. 2A.

At this bobbin, turn changeover portions 11a between individual turns of the round wire 11 are invariably set at an end surface 16c located on a coil-end side (one of the end surfaces of the bobbin 13 facing opposite each other along the stator axis). In the example presented in FIGS. 3A and 3B, the round wire 11 is wound at the winding portion 16 over three turns, with a turn changeover portion 11a shifting from the first turn to the second turn, a turn changeover portion 11a shifting from the second turn to the third turn and a turn changeover portion 11a shifting from the third turn to the fourth turn, all formed at the upper end surface 16a, as shown in FIG. 3A. At the side surfaces 16b of the winding portion 16, the individual wraps of the round wire 11 are set in a neat, tight formation without forming any gap.

The rectangular wire 15 should, ideally, achieve a winding formation shown in FIGS. 4A and 4B, similar to that achieved with the round wire 11, as shown in FIGS. 3A and 3B. Namely, turn changeover portions 15a should be formed at one of the end surfaces of the bobbin 13 at a coil-end side, with the individual wraps of the rectangular wire 15 wound in a neat, tight formation without forming any gap at the side surfaces of the bobbin.

However, grooves descending in a circular arc cannot be formed at the surfaces of the winding portion 16 in conjunction with the coil 8 constituted with the rectangular wire 15. Instead, the side surfaces of the winding portion 16 form flat planes, as illustrated in FIG. 2B. This tends to cause misalignment of the rectangular wire 15 along the turn-advancing direction during a turn changeover, i.e., as the rectangular wire 15 having been wound through a given turn, starts a new turn, and in the event of such misalignment, the ideal winding formation shown in FIGS. 4A and 4B cannot be achieved.

Figure 5A:
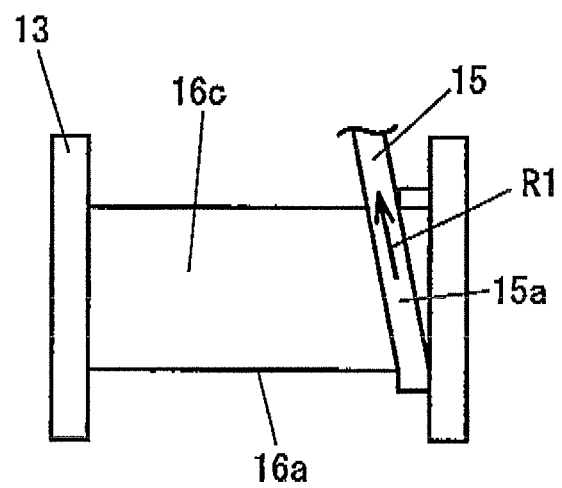
FIGS. 5A and 5B illustrate how rectangular wire, being wound at a bobbin, changes over from the first turn to the second turn.
Figure 5B:
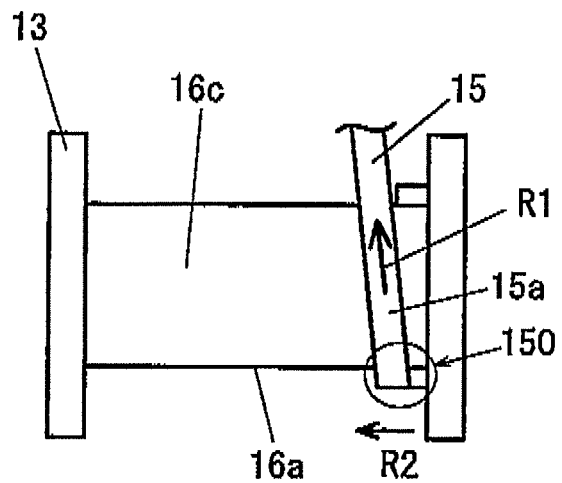

FIGS. 5A and 5B illustrate the changeover from the first turn to the second turn, which occurs as the rectangular wire 15 is wound at the bobbin 13. As shown in FIG. 5A, the turn changeover portion 15a of the rectangular wire 15 is wound in a diagonal direction during the changeover from the first turn to the second turn, and thus, a diagonal force, indicated by an arrow RI, is be applied to the rectangular wire 15. As a result, the rectangular wire 15 slips along a direction indicated by an arrow R2 and becomes misaligned at the turn changeover start area 150 in FIG. 5B.

Figure 6A:
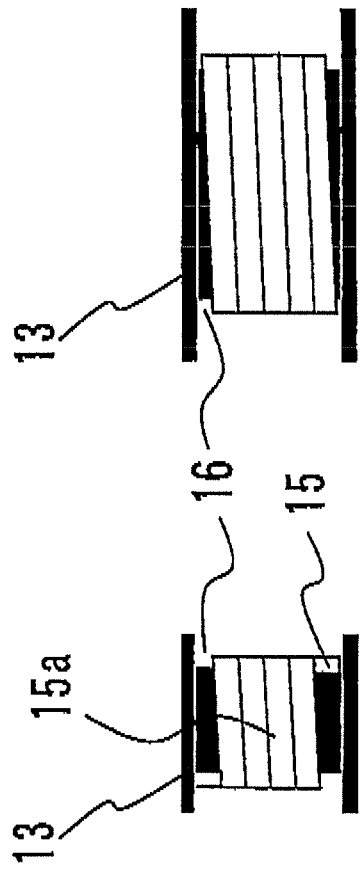
FIGS. 6A and 6B illustrate a winding formation manifesting misalignment.
Figure 6B:
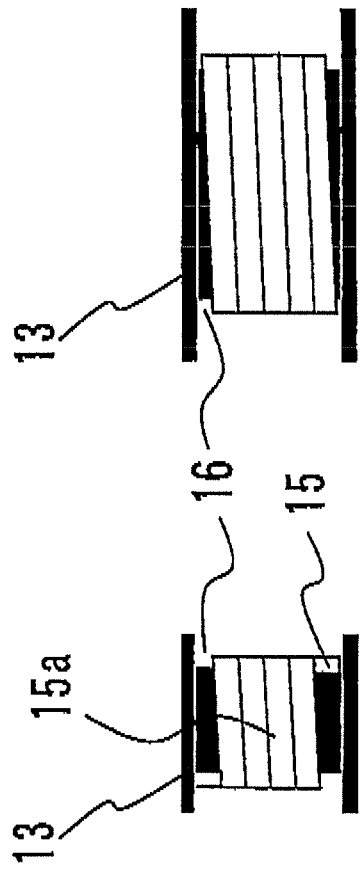

Subsequently, as the rectangular wire 15 is further wound through the second turn and the third turn in sequence, the coil in the first layer is bound to take on a winding formation such as that shown in FIGS. 6A and 6B. Due to the misalignment manifesting in the first turn, the rectangular wire 15 becomes misaligned along the turn-advancing direction on the side where the turn changeover portions 15a are formed and the individual wraps of the rectangular wire 15 are arranged diagonally at the bobbin-side surfaces. As a result, gaps are formed at the winding portion 16 of the bobbin 13, which, in turn, reduces the number of turns with which the rectangular wire 15 can be wound. The winding formation in the example presented in FIGS. 6A and 6B has one fewer turns compared to the ideal formation shown in FIGS. 4A and 4B.

Figure 7A:
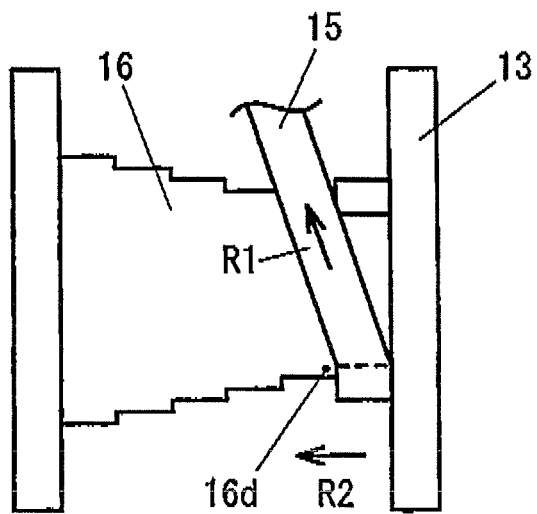
FIGS. 7A and 7B illustrate how misalignment occurs at a bobbin assuming a staged structure.
Figure 7B:
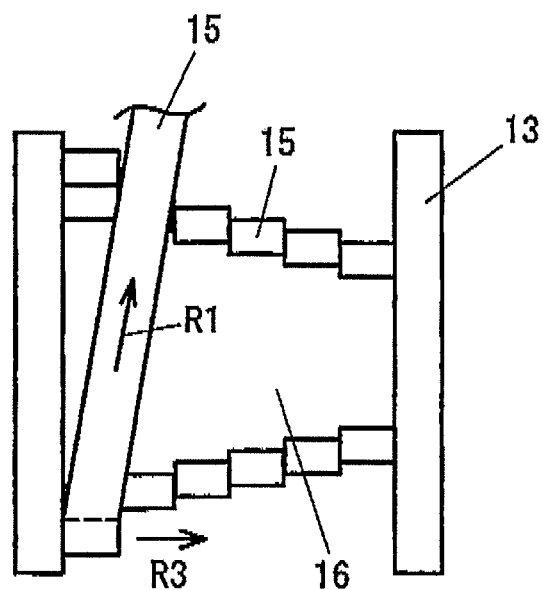

A bobbin 13 adopting a staged structure such as that shown in FIGS. 7A and 7B, so as to ensure that rectangular wire can be wound in a neat winding formation has been proposed in the related art. As shown in FIG. 7A, the side surface of the rectangular wire 15 facing toward the turn-advancing direction is regulated via a stage 16d as the turn advances from a lower stage toward a higher stage. Thus, even if the diagonal force R1 is applied to the rectangular wire 15 in the first turn in the changeover from the first turn to the second turn, misalignment, which would occur along the direction indicated by the arrow R2, can be prevented.

However, the turn-advancing direction is reversed when the rectangular wire 15 is wound in the second layer, as shown in FIG. 7B. This means that the stage formed by the outer side surface of the first layer coil does not function as a regulating portion against misalignment occurring along a direction indicated by an arrow R3 as the rectangular wire in the second layer changes from the first turn to the second turn. As a result, the rectangular wire 15, manifesting misalignment in the second layer, fails to achieve the ideal wiring formation.

Figure 8:
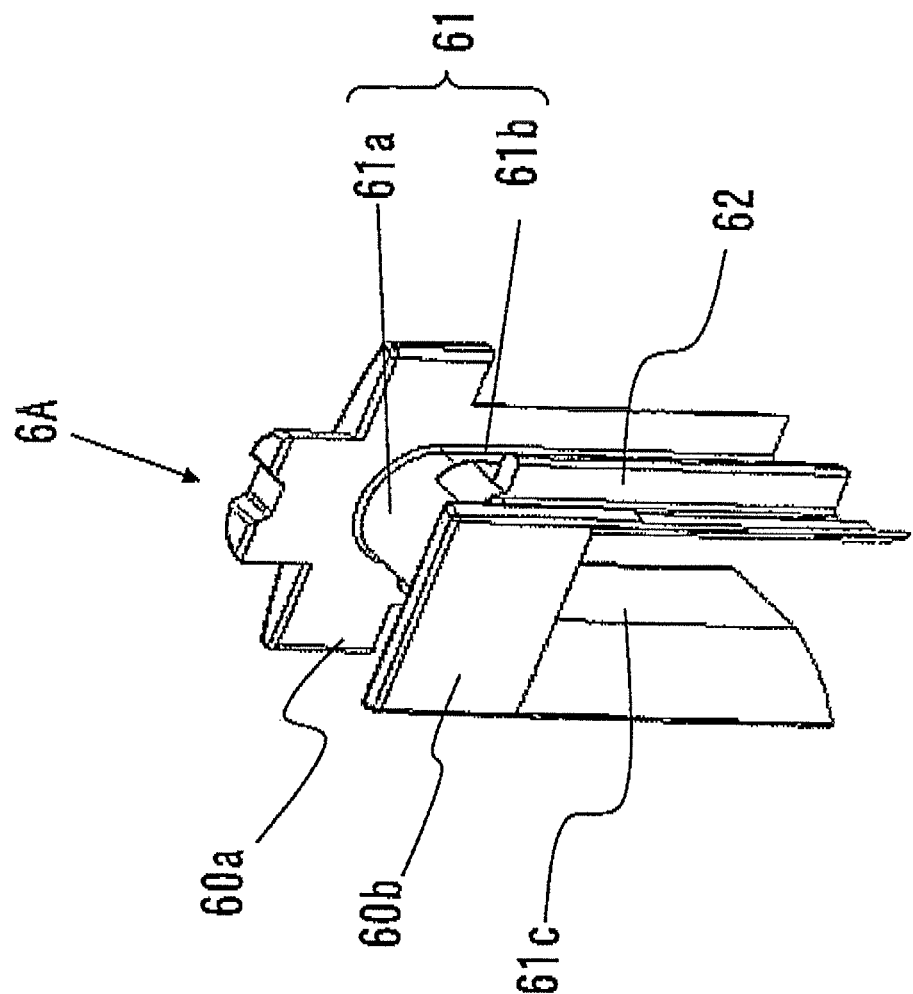
FIG. 8 is a perspective of a bobbin segment.
Figure 9:
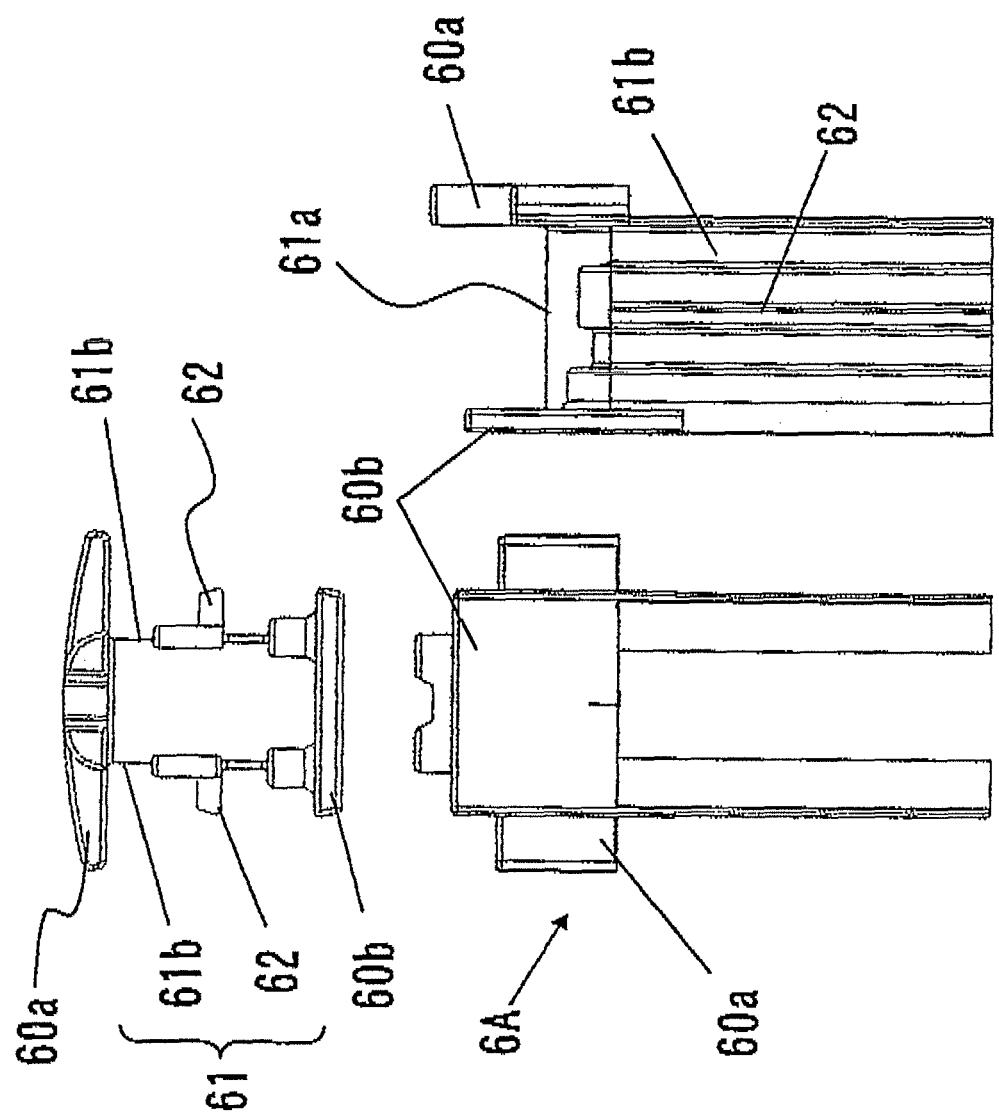
FIG. 9 provides trihedral views of the bobbin segment.

Accordingly, in the embodiment, a projecting portion 62, with which misalignment of the rectangular wire 15 can be prevented regardless of the turn-advancing direction, is formed at each side surface 61b of a winding portion 61, as shown in FIGS. 8 and 9. FIG. 8 is a perspective of a bobbin segment 6A used in the embodiment. In addition, FIG. 9 provides trihedral views of the bobbin segment 6A. The bobbin 6 shown in FIG. 1 is formed by attaching two bobbin segments 6A identical to that shown in FIGS. 8 and 9, i.e., by abutting a top bobbin segment 6A to a bottom bobbin segment 6A. Namely, one of the two bobbin segments 6A is mounted from the side where one end surface (coil end-side surface) of the tooth 42 is located, whereas the other bobbin segment 6A is mounted from the side where the other end surface of the tooth 42 is located.

The bobbin segment 6A includes collars 60a and 60b formed at the two ends facing opposite each other along the direction in which the tooth projects, i.e., one formed on the tooth base side and the other formed on the tooth front-end side. The area between the collar 60a and the collar 60b forms the winding portion 61. A projecting portion 62 is formed at each of two side surfaces 61b of the winding portion 61. The projecting portion 62 ranges along the axis of the core block 40, i.e., along the axis of the stator 2. It is to be noted that stages similar to those in the related art are also formed at the side surfaces 61b as well.

Figure 10:
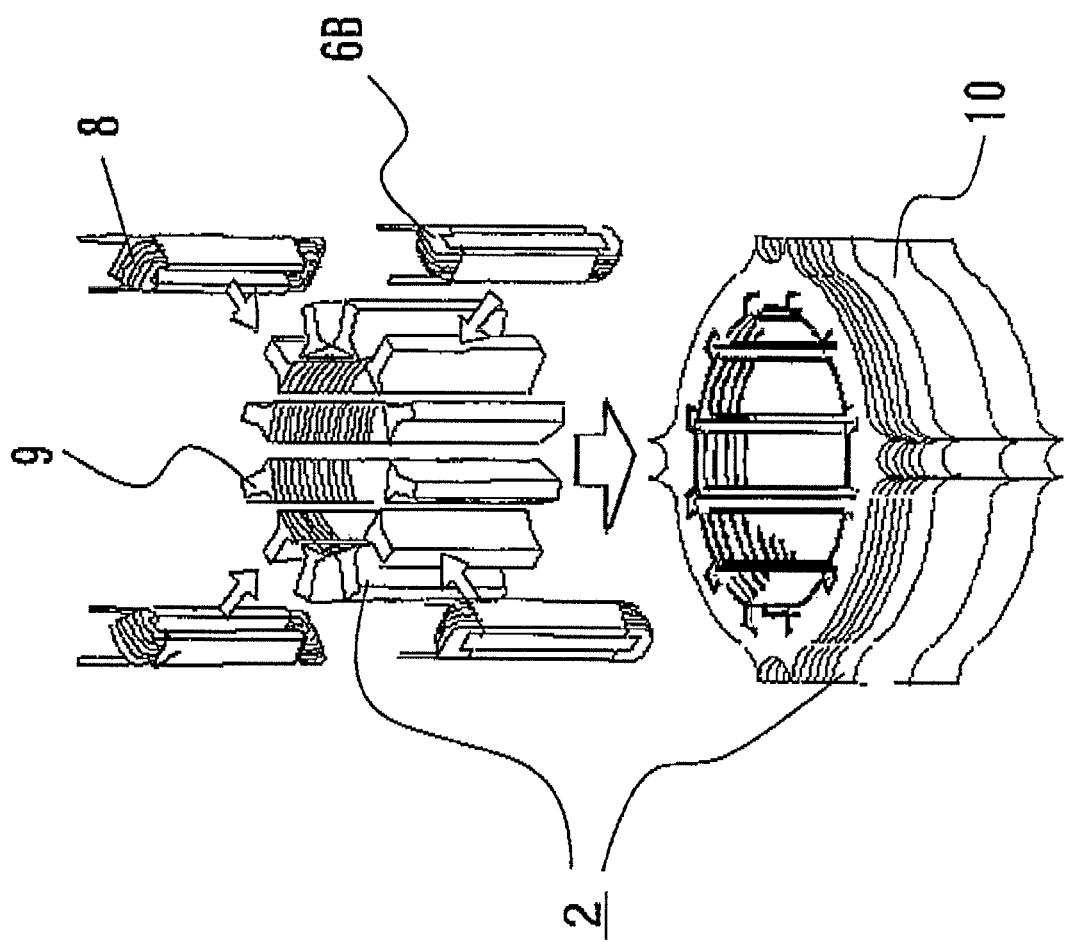
FIG. 10 illustrates a single-piece bobbin.

It is to be noted that while the embodiment will be described by assuming that the bobbin 6 is constituted with two bobbin segments, the present invention is not limited to this example and it may be adopted in conjunction with a non split-type bobbin formed as a single-piece bobbin by inverting a lower bobbin segment 6A relative to an upper bobbin segment 6A and then integrating them. In such a case, too, projecting portions 62 should be formed exactly as at the split-type bobbin and the projecting portions 62 will achieve advantages the same as those achieved with the projecting portions 62 formed at the split-type bobbin. A single-piece bobbin 6B will be used in a stator core 2 such as that shown in FIG. 10, which includes a tooth unit 9 and a back yoke unit 10 provided as separate units.

Figure 11A:
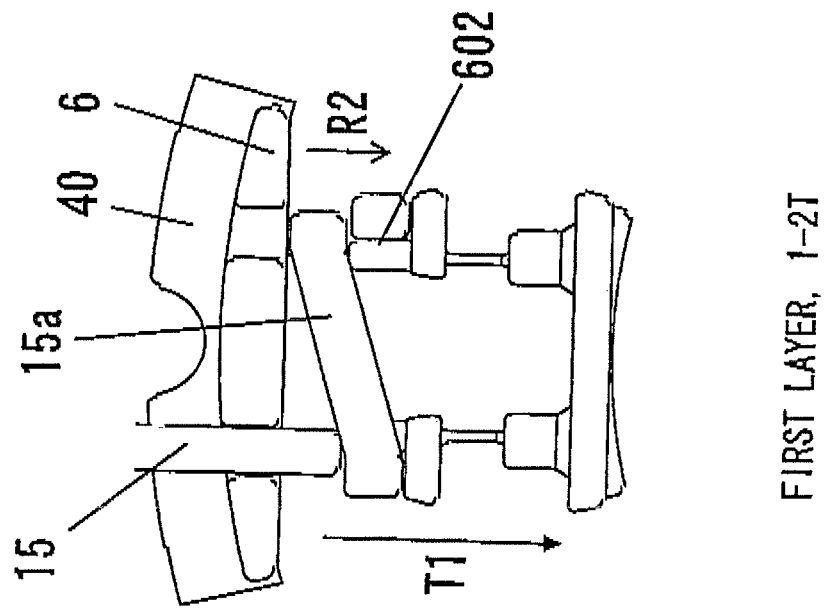
FIGS. 11A and 11B, in reference to which the winding process is to be described, respectively show the bobbin yet to undergo the winding process and the bobbin at which the coil has been wound through the second turn in the first layer.
Figure 11B:
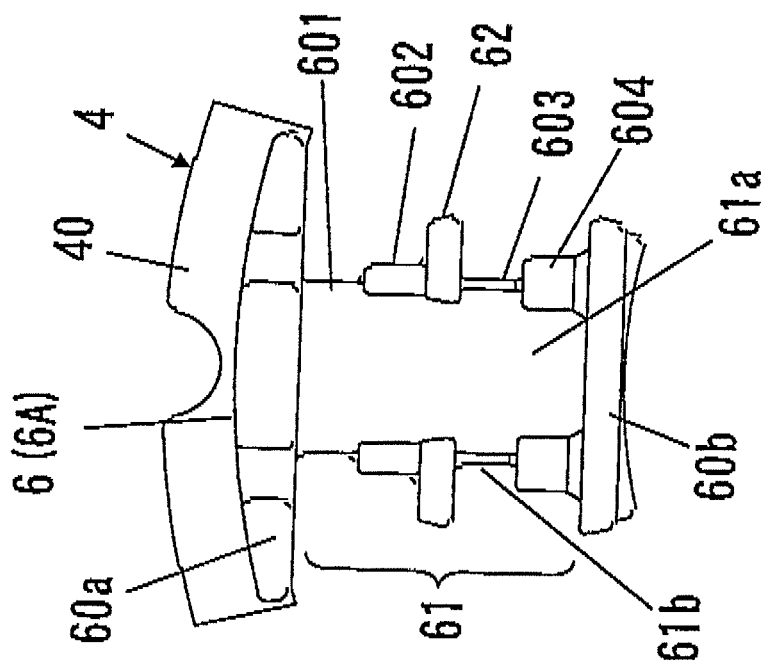

Next, the functions of the projecting portions 62 will be described in reference to FIGS. 11A through 14B illustrating the winding process. FIG. 11A shows the bobbin 6 (formed by combining two bobbin segments 6A) yet to undergo the winding process, viewed from a coil-end side. It is to be noted that through this winding process, the rectangular wire 15 is wound over two layers at the bobbin 6 (with the eighth turn alone wound in the third layer). At the side surfaces 6 lb of the winding portion 61, projecting portions 62 arc formed in addition to stages. At the bobbin segments 6A shown in FIG. 11A, at which the rectangular wire is to be wound over four turns in the first layer, the projecting portions 62 are formed between the second turn winding position and the third turn winding position. In addition, stages 601 at which the first turn winding is wrapped are lower than stages 602 at which the second turn winding is wrapped. Likewise stages 603 at which the third turn winding is wrapped are lower than stages 604 at which the fourth turn winding is wrapped. It is to be noted that the difference between the height of a given stage and the height of the next stage is set smaller than the height-wise dimension of the rectangular wire 15 being wound thereat In FIG. 11B, illustrating the changeover from the first turn to the second turn, the rectangular wire 15 has been wound up to the second turn. It is to be noted that the turn-advancing direction for the first layer is set so as to advance from the tooth base-side toward the front end, as indicated by an arrow Ti. After the rectangular wire 15 is wound at the stages 601 at the side surfaces 61b over the first turn, it is wound at the stages 602 over the second turn. Since the stages 602, located further along the turn-advancing direction, have greater height, the side surface of a stage 602 functions as a regulating portion against any misalignment that might occur along the R2 direction at the changeover start area of the turn changeover portion 15a, as shown in FIG. 5B, as the coil winding shifts from the first turn to the second turn. As a result, the second turn winding can be wrapped at the stages 602 without allowing any misalignment of the changeover start area of the turn changeover portion 15a.

Figure 12A:
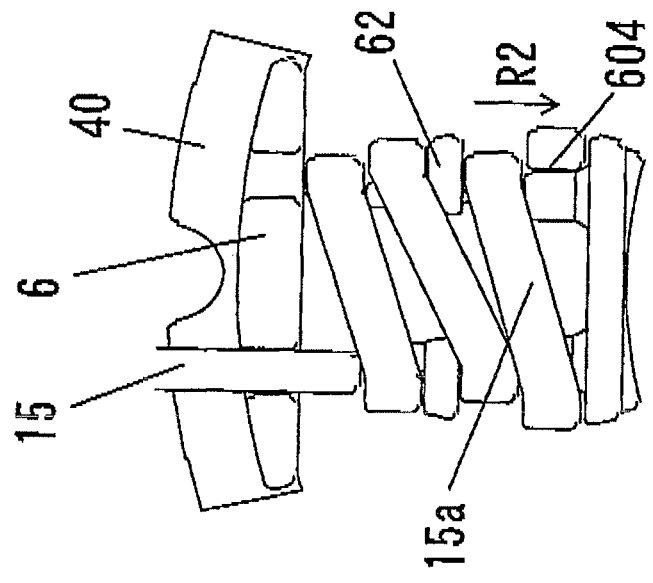
FIGS. 12A and 12B, in reference to which the winding procedure is to be described, respectively show the bobbin at which the wire has been wound through the third turn in the first layer and the bobbin at which the wire has been wound through the fourth turn in the first layer.

In FIG. 12A, illustrating a changeover from the second turn to the third turn, the rectangular wire 15 has been wound up to the third turn. As the rectangular wire 15 wound over the second turn shifts into the third turn, the changeover start area of the turn changeover portion 15a becomes held at the surface of a projecting portion 62 located on the upper side in the figure, i.e., the surface located on the side opposite from the turn-advancing direction. As a result, misalignment of the changeover start area along the R2 direction is disallowed.

Figure 12B:
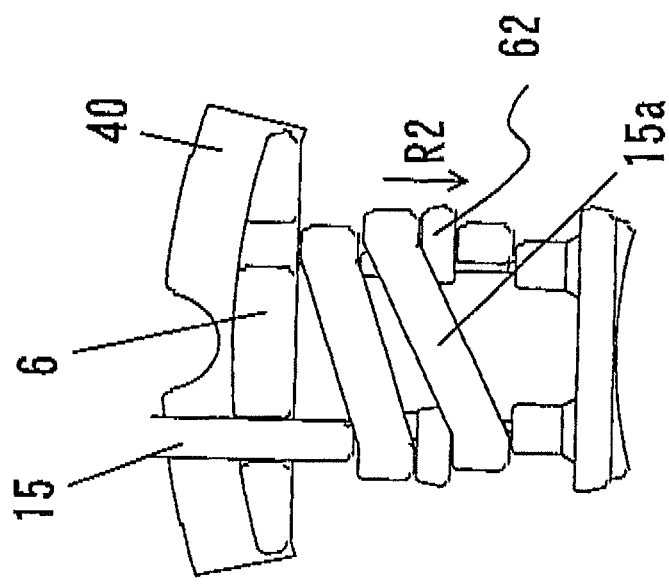

In FIG. 12B, illustrating a changeover from the third turn to the fourth turn, the rectangular wire 15 has been wound up to the fourth turn. A stage 604 is located further along the turn-advancing direction and has greater height, and thus, a side surface of the stage 604 functions as a regulating portion against any misalignment that might occur along the R2 direction at the changeover start area as the rectangular wire 15, wound over the third turn, shifts into the fourth turn. As a result, the fourth turn winding can be wrapped at the stages 604 without allowing any misalignment of the changeover start area.

Figure 13A:
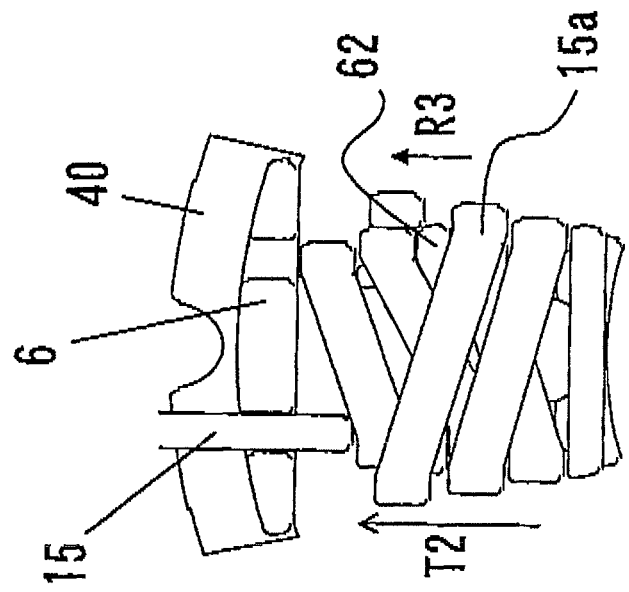
FIGS. 13A and 13B, in reference to which the winding procedure is to be described, respectively show the bobbin at which the wire has been wound through the fifth turn in the second layer and the bobbin at which the wire has been wound through the sixth turn in the second layer.

The subsequent FIGS. 13A through 14B illustrate the winding process through which the rectangular wire is wound through the second layer and the third layer. The turn-advancing direction for the second layer is reversed from the turn-advancing direction assumed for the first layer. In other words, it advances from the tooth front-end side toward the tooth base, as indicated by an arrow T2 in FIG. 13A. In FIG. 13A, illustrating the changeover from the fourth turn to the fifth turn in the second layer, rectangular wire 15 has been wound up to the fifth turn. The rectangular wire in the fifth turn is stacked atop the upper side of the rectangular wire 15 in the third turn. As indicated in FIG. 123, a side surface of the rectangular wire 15 in the fourth turn, wound at the stages 604 faces opposite a side surface of the rectangular wire 15 in the third turn. Thus, as the rectangular wire changes over from the fourth turn to the fifth turn, the side surface of the rectangular wire 15 in the third turn functions as a regulating portion that prevents misalignment of the changeover start area along the R3 direction (along the turn-advancing direction).

Figure 13B:
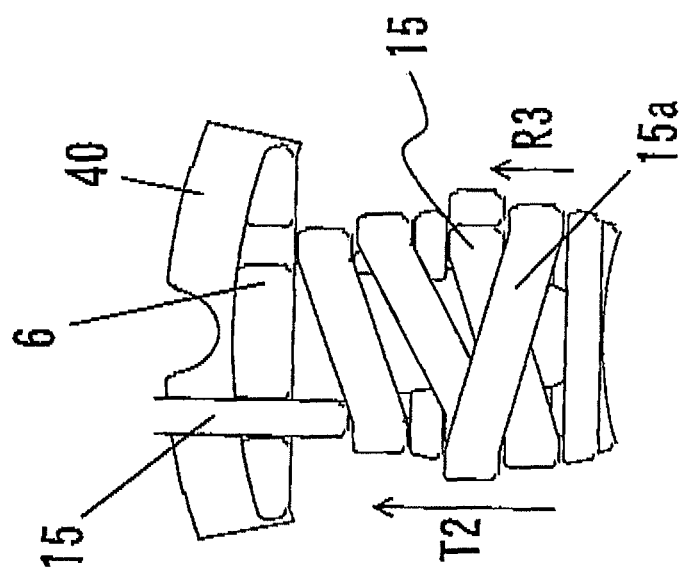

In FIG. 13B, illustrating a changeover from the fifth turn to the sixth turn in the second layer, the rectangular wire 15 has been wound up to the sixth turn. The rectangular wire in the sixth turn is stacked atop the upper side of the rectangular wire 15 in the second turn. Thus, as the rectangular wire changes over from the fifth turn to the sixth turn, the rectangular wire 15 becomes held at the surface of the projecting portion 62 located on the lower side in the figure, i.e., at the surface of the projecting portion 62 located on the side opposite from that turn-advancing direction, over the changeover start area of the turn changeover portion 15a. As a result, the rectangular wire 15 is not allowed to become misaligned along the R3 direction over its changeover start area. It is to be noted that the height of the projecting portion 62 is set so that its front end assumes a height smaller than that of the outer side surface of the outermost layer (the second layer in this example) and that the front end height is greater than that of the inner side surface of the outermost layer, i.e., the outer side surface of the inner layer, adjacent to the outermost layer (the first layer in this example).

In FIG. 14A, illustrating a changeover from the sixth turn to the seventh turn in the second layer, the rectangular wire 15 has been wound up to the seventh turn. The rectangular wire in the seventh turn is stacked atop the upper side of the rectangular wire 15 in the first turn. It is to be noted that while there is no portion that may function as a regulating portion in this formation as the rectangular wire changes over from the sixth turn to the seventh turn since the second turn assumes a greater height than the first turn, the rectangular wire is nevertheless wound for the eighth turn.

FIG. 14B illustrates the changeover from the seventh turn to the eighth turn in the third layer. The rectangular wire 15 in the eighth turn is wound so as to lie over the rectangular wire 15 in the seventh turn. Since the rectangular wire 15, changing over from the seventh turn to the eighth turn, is not wound diagonally, there is no risk of misalignment. It is to be noted that since there is no regulating portion to prevent misalignment as the rectangular wire changes over from the sixth turn to the seventh turn as described earlier, misalignment may occur during the changeover from the sixth turn to the seventh turn. However, since the rectangular wire has been wound without any misalignment up to the sixth turn, the extent of overall misalignment occurring through the seventh turn will be insignificant and the resulting adverse effect will also be negligible. For this reason, the seventh-turn rectangular wire 15 and the eighth-turn rectangular wire 15 can be inserted through the gap between the seventh-turn rectangular wire 15 and the collar 60a, as shown in FIGS. 14A and 14B.

As described above, the concentrated winding coil 8 achieved in the embodiment includes a first layer coil formed by winding the rectangular wire 15 in a first turn advancing mode, with a sequential coil turn pattern formed so as to advance from one end of the bobbin 6 toward the other end of the bobbin 6, and a second layer coil formed by winding the rectangular wire 15 in a second turn advancing mode with a coil turn pattern formed so as to advance from the other end of the bobbin 6 toward the one end of the bobbin 6. The bobbin 6 (constituted with two bobbin segments 6A), i.e., an insulating bobbin, includes the winding portion 61 at which the coil 8 is formed, the collars 60a and 60b formed at the two ends of the winding portion 61 and at least one projecting portion 62 used to prevent misalignment that might otherwise occur at the turn changeover start area 150 in the first and second turn advancing modes.

Namely, the projecting portion 62 is formed at a position where misalignment tends to occur readily, e.g., at the position equivalent to the boundary between the second turn and the third turn at a side surface 61b of the bobbin 6 in the example presented in FIGS. 8 and 9. As a result, misalignment of the rectangular wire 15 changing over from the second turn to the third turn and also shifting from the fifth turn to the sixth turn along the opposite turn-advancing direction is prevented via the projecting portion 62. Thus, even in conjunction with the rectangular wire 15, a winding formation close to an ideal winding formation such as that shown in FIGS. 4A and 4B can be achieved, and consequently, the number of turns does not decrease.

In addition, it is desirable that the projecting portion 62 be formed so that its front end takes up a position between the position assumed for the outer side surface of the coil 8 in the outermost layer (second layer) and the position assumed for the inner side surface of the coil 8 in the same layer. The projecting portion 62 should take on a height as small as possible since a projecting portion 62 assuming a great height will tend to become an obstruction during the winding process. Accordingly, the height of the projecting portion 62 is set so that it is lower than the outer side surface of the outermost layer coil and, at the same time, higher than the inner side surface of the outermost layer coil (i.e., the outer side surface of the coil in the adjacent inner layer) in the embodiment, thereby assuring both reliable prevention of misalignment and ease of the winding process.

Figure 15A:
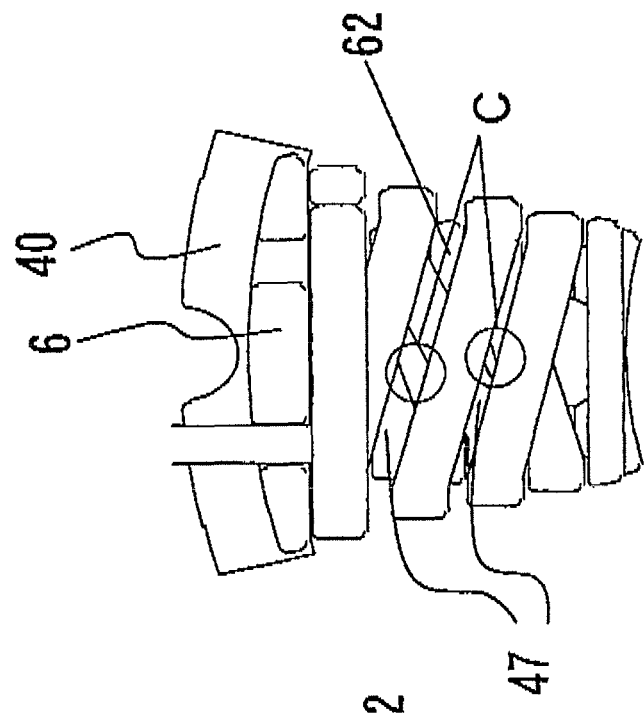
FIGS. 15A and 15B respectively show the bobbin at which the wire has been wound to complete the first layer and the bobbin at which the wire has been wound to complete the third layer.
Figure 15B:
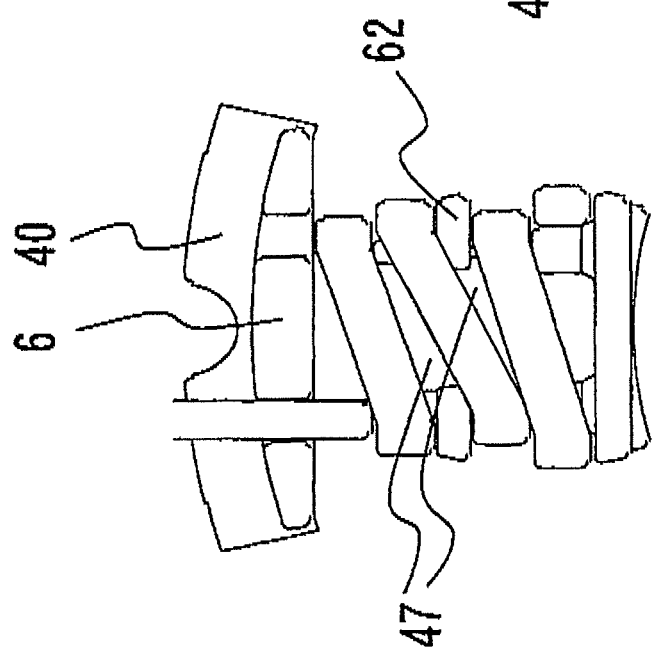

FIG. 15A shows the winding formation achieved when the rectangular wire has been wound through the first layer, whereas FIG. 15B shows the winding formation achieved when the rectangular wire has been wound through the third layer. The presence of the projecting portion 62 in the embodiment allows the rectangular wire 15 to be wound to achieve an ideal winding formation. As shown in FIG. 15A, gaps 47 are formed between the turn changeover portion corresponding to the first turn and the turn changeover portion corresponding to the second turn and between the turn changeover portion corresponding to the second turn and the turn changeover portion corresponding to the third turn on the coil-end side. In addition, as shown in FIG. 15B, a gap 47 is formed between each two successive turns among fifth through seventh turns wrapped next to the projecting portion 62 in the second layer as well. Over each area indicated by the letter C, a gap 47 in the second layer sits atop a gap 47 formed in the first layer. As air or oil (oil used for purposes of cooling or lubrication) flows through these gaps 47, the rectangular wire coil can be cooled with better cooling performance compared to that achieved for a simple solid coiling.

Figure 16:
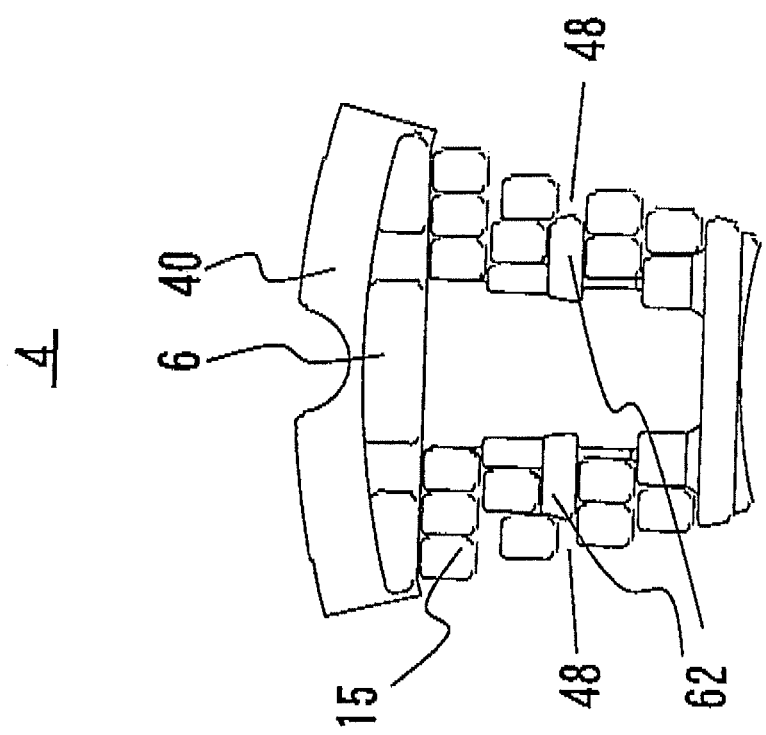
FIG. 16 is a sectional view of a core segment at which the winding process has been completed.

FIG. 16 shows a core segment achieving the final winding formation shown in FIG. 15B, in a sectional view taken through a plane perpendicular to the stator axis, As this sectional view clearly indicates, the presence of the projecting portion 62 also results in the formation of gaps 48 at the side surfaces of the bobbin. Thus, the coil surface area that is exposed without individual coil surfaces coming into contact with each other increases. As air or oil flows through these gaps 48, an effect similar to that realized with the gaps 47 on the coil end side, i.e., the coil is cooled more effectively, is achieved. Better cooling performance, in turn, makes it possible to reduce the resistance loss at the rotating electrical machine.

It is to be noted that while FIG. 11A shows projecting portions 62, each formed at one of the two side services 61b of the bobbin segment 6A, only the projecting portion 62 on the right side in the figure contributes to the prevention of misalignment of the rectangular wire 15, as has been explained in reference to FIGS. 11A through 14B illustrating the winding process, For this reason, as long as the winding mode having been described in reference to FIGS. 11A through 14B is adopted, it is not necessary to form a projecting portion 62 on the left side in the figures.

In the embodiment, the projecting portions 62 are each formed at one of the two side surfaces 61b of the bobbin 6 (bobbin segments 6A) for the following reason. In the example presented in FIG. 1, the coil 8 in a given core segment 4 among the twelve core segments 4 is wound along a direction that is opposite from the direction along which the coil 8 in the core segment 4 present next to the particular core segment 4 is wound. Namely, while the rectangular wire is wound counterclockwise viewed from the tooth front end in the example presented in FIGS. 11A through 14B, the coil 8 in the core segment 4 present right next to this core segment 4 is formed by winding the rectangular wire in the clockwise direction. For this reason, projecting portions 62 are formed at the two side surfaces 61b of each bobbin segment 6A in the embodiment so as to allow identical bobbin segments 6A to be used in conjunction with all core segments 4 regardless of whether the rectangular wire is to be wound forward or backward in a given core segment 4.

However, it will be obvious that a special bobbin segment 6A, to be exclusively used in a core segment 4 where the rectangular wire is to be wound clockwise, and another bobbin segment 6A, to be exclusively used in a core segment 4 where the rectangular wire is to be wound counterclockwise, may be designed and that a projecting portion 62 will need to be formed only at the specific side surface 61b of each core segment where misalignment needs to be prevented.

Furthermore, the maximum advantage can be achieved by forming a projecting portion 62, i.e., a member used to prevent misalignment occurring at the turn changeover start area 150 (see FIG. 5B) of the rectangular wire 15, in the vicinity of the boundary between an end surface 61a and a side surface 61b as shown in FIG. 9. It is to be noted that the projecting portions 62 at the bobbin segment 6A shown in FIG. 9 each range from the point near the boundary with the end surface 61a to the lower end of the side surface 61b. Namely, at the bobbin 6 achieved by combining two bobbin segments 6A, the projecting portions 62 range over the entire length of the side surfaces 61b. However, a projecting portion 62 may be formed so as to range only over an area near the end surface where the turn changeover portions 15a are to be formed.

Figure 17A:
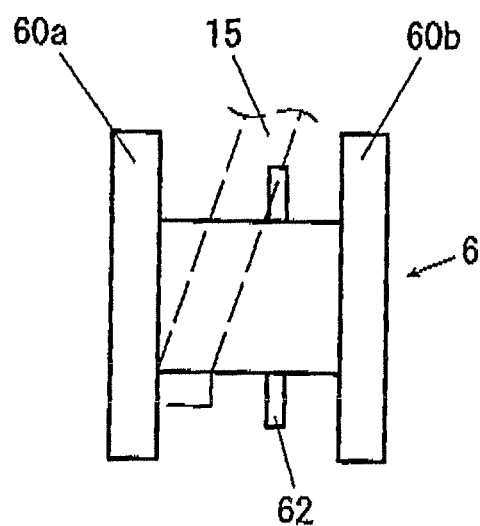
FIGS. 17A and 17B show a bobbin having projecting portions each formed at one of the two side surfaces at which wire is wound with three turns.
Figure 17B:
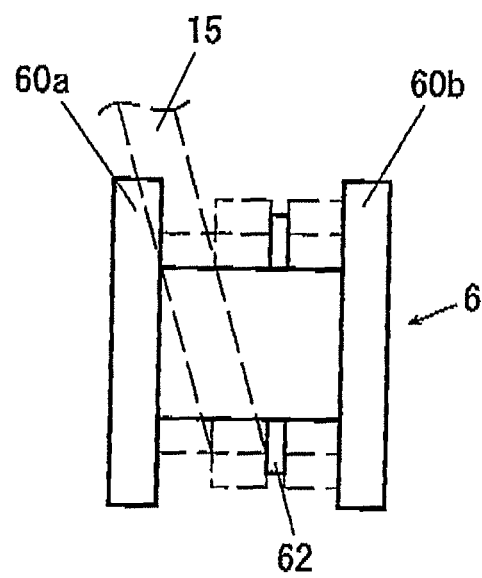

In addition, it is not strictly necessary to form a projecting portion 62 in correspondence to each turn in order to achieve an ideal winding formation. Even if projecting portions 62 are formed in a quantity not corresponding to the number of turns, each projecting portion 62 prevents misalignment occurring at a turn in each advancing directions and thus, a winding formation that is close to ideal can be achieved. Furthermore, at a bobbin with a single projecting portion 62 formed at each side surface, at which the wire is wound with three turns in the first layer, such as that shown in FIGS. 17A and 17B, misalignment tends to manifest readily as the changeover from the first turn to the second turn occurs in the first layer and also as the changeover from the fifth turn to the sixth turn in the second layer occurs in the second layer.

However, an ideal winding formation can be achieved by winding the rectangular wire 15 so as to insert it between the already wound rectangular wire 15 and the projecting portion 62 or between the already wound rectangular wire 15 and the collar 60a as at the sixth turn and the seventh turn in FIG. 14 A. In addition, by forming both the projecting portions 62 and the stages 601 through 604 as shown in FIG. 11A and using a projecting portion 62 in combination with a stage assuming a height smaller than that of the rectangular wire 15, a winding formation that is substantially ideal can be achieved while minimizing the quantity of projecting portions 62.

Figure 18:
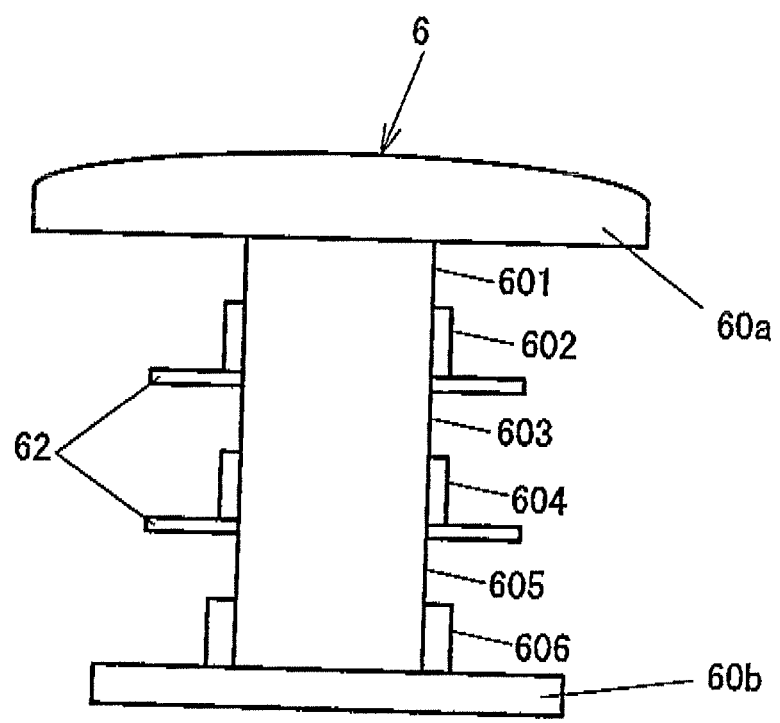
FIG. 18 shows a bobbin with two projecting portions formed at each side surface.

It is to be noted that while the embodiment has been described by assuming that the coil 8 is wound over two layers, the present invention is not limited to this example and it may be adopted in conjunction with a coil wound over three or more layers instead of two layers, and in such a case, too, similar advantages are achieved. In addition, two or more projecting portions may be formed at each side surface, as shown in FIG. 18, the wire is to be wound with a large number of turns in the first layer. In the example presented in FIG. 18, two projecting portions 62 are formed at each side surface, with stages 601 through 606 formed so as to create steps between the projecting portions 62, between one of the projecting portions 62 and the collar 60*a* and between the other projecting portion 62 and the collar 60*b*. These stages achieve an advantage similar to that of the stages shown in FIG. 11A.

In the embodiment of the invention described above, an even more ideal winding formation can be achieved in a rotating electrical machine with a concentrated winding coil constituted with rectangular wire by preventing misalignment of the rectangular wire from occurring while the concentrated winding coil is formed with the rectangular wire wound at a core segment.

It is to be noted that the embodiment described above simply represents an example and the present invention may be interpreted without being subjected to any limitations or restrictions pertaining to the correspondence between the details described in reference to the embodiment and the contents included in the scope of patent claims.

What is claimed is:

1. A rotating electrical machine, comprising:
    a stator that includes a plurality of core segments disposed in a circular formation, an insulating bobbin mounted at each of the core segments and a concentrated winding coil formed by winding wire with a rectangular cross section at the insulating bobbin; and
    a rotor, rotatably disposed so as to rotate freely relative to the stator, wherein:
    each core segment includes a yoke and a tooth, formed so as to project out from the yoke, at which the insulating bobbin is mounted;
    the concentrated winding coil includes a single-layer coil, corresponding to one layer, wound in a first turn advancing mode with the wire forming sequential coil turns starting from one end of the insulating bobbin toward another end of the insulating bobbin and another single-layer coil, corresponding to one layer, wound in a second turn advancing mode with the wire forming turns starting from the other end of the insulating bobbin toward the one end of the insulating bobbin, with the single-layer coil and the other single-layer coil layered alternately to each other;
    the insulating bobbin includes a winding portion where the concentrated winding coil is formed, collars each formed at one of two ends of the winding portion and at least one projecting portion configured to disallow misalignment at a turn changeover start area in the first turn advancing mode and the second turn advancing mode;
    the projecting portion is formed so that a front end of the projecting portion takes a position between an outer side surface position of the single-layer coil constituting an outermost layer in the concentrated winding coil made up with a plurality of layers and an inner side surface position of the single-layer coil constituting the outermost layer; and
    the projecting portion is formed at a plurality of locations so that a plurality of projecting portions are present side-by-side between the collars, and a stage with a height thereof smaller than a thickness of the wire measured along a layering direction is formed between each collar and the projecting portion next to the collar and between the projecting portions present side-by-side.

* * * * *